United States Patent

Vier et al.

[15] 3,659,786
[45] May 2, 1972

[54] PROCESS AND INSTALLATION FOR BURNING COMBUSTIBLE MIXTURES

[72] Inventors: Fritz Vier; Bernhard Winkeler, both of Salzbergen, Germany

[73] Assignee: Wintershall Aktiengesellschaft, Kassel, Germany

[22] Filed: Dec. 23, 1970

[21] Appl. No.: 100,968

[52] U.S. Cl. ................................ 239/5, 110/75, 239/8, 239/11
[51] Int. Cl. ................................................ F02d 1/06
[58] Field of Search .................. 110/75; 239/5, 8, 11, 419, 239/419.3, 405, 407, 416.1, 416.4, 422, 428

[56] References Cited

UNITED STATES PATENTS 3,176,921  4/1965  De Voe ............................ 239/8
3,357,375  12/1967  Brophy ............................ 110/75
3,489,108  1/1970  Garver et al. ..................... 110/75

Primary Examiner—M. Henson Wood, Jr.
Assistant Examiner—Edwin D. Grant
Attorney—Waters, Roditi, Schwartz & Nissen

[57] ABSTRACT

A process and burner installation for burning combustible waste product sludges containing solid particulate contaminants, including a nozzle chamber adapted to mix the waste sludge with pressurized air. The static air pressure in the nozzle chamber is maintained at a predetermined pressure head in order to regulate the inlet of sludge to the chamber, so as to thereby effect control over the ratio of sludge to air in the mixture formed for burning.

10 Claims, 3 Drawing Figures

PROCESS AND INSTALLATION FOR BURNING COMBUSTIBLE MIXTURES

This invention relates to a process and installation for burning combustible mixtures and, more particularly, to a process and installation for burning pumpable homogenized combustible mixtures such as oily sludges or the like containing particulate contaminants.

In industry, the disposal of many types of residual or waste products creates complex and burdensome technological problems. In particular, waste products in industries such as, for example, petroleum processing plants, oil refineries, petrochemical plants and industrial manufacturing plants, produce large quantities of waste products containing dirty oil substances, oily liquid refuse, waste and emulsifier oils, organic residues such as varnishes and solvents which form oily sludges containing solid particles, which must be disposed of economically while considering the possible effects of polluting streams and the environment in the dumping of these waste products. Furthermore, quite similar serious problems arise in the disposal of biological sewage, and from the disposal of oily scum and sediment-containing sludges resulting from waste water clarification, particularly from clarification processes relating to inorganic and/or organic flocculants.

FIELD OF THE INVENTION

A particularly desirable process in the treatment of these types of residual waste products has been the combustion or burning thereof, which will, in effect, eliminate the pollution of streams and environs into which such waste products have previously been poured. Although various processes and installations for the combustion or burning of such oil-bearing, solids containing sludges have been heretofore proposed, these have encountered considerable technological problems during practical application thereof when the waste products being burned have not been extensively pre- treated. In effect, in prior art processes for burning combustible waste sludges, the solid or particulate contaminants in the sludges or mixture being burned have generally tended to clog and foul valves and shuttlecocks in the conduits supplying the sludges, thereby adversely affecting any practicable control or regulation of the volume and consistency of the waste sludge material being pumped through the waste disposal system. Consequently, combustion of such sludges through prior art installations at best has proved to be erratic and resulted in frequently incomplete burning of the waste material.

It has also been difficult to provide installations for the complete combustion or burning of oily sludge waste products which are operative for extensive periods of time. Since solids particulate containing waste sludges can only be burned in presently available burners providing adequate pumping pressure is supplied thereto, pumps which must provide this pressure have been subjected to undue wear and tear causing frequent pump breakdowns, resulting from the inherent deleterious nature of the waste sludges containing the particulate contaminants, thereby rendering such waste product combustion processes and installations costly and inefficient in operation.

It has been now proposed to provide specialized burner installations in which solids containing oily sludges are burned through a process whereby the sludges are admitted to an inner tube containing a flow nozzle having relatively large dimensions. The inner tube is positioned within a secondary conduit which conveys combustion assisting air to the waste sludge in a vortex stream adjacent to the ignition nozzle of the burner. Although this may provide generally satisfactory burning performance, the quantity of sludge being burned is controlled by a complex valve arrangement and pressure generating pump which are subject to the wear and tear and breakdowns of earlier combustion installations for waste products or sludges.

In another prior art process and apparatus for burning oil-bearing, solids contaminated waste sludges, the sludges are introduced into the inner casing of a combined gas-oil burner of generally known standard type construction. This particular burning process requires that the waste sludges be pumped into the burner by an intricate pumping system wherein the quantity of sludges being consumed in the burning process is controlled by a suitable valve arrangement. Accordingly, as in the previously discussed processes and installations for combusting the sludges or waste products, there is again the problem of undue wear and tear of the various components of the installation, which leads to the rapid deterioration of the burning process, thereby rendering these installations inefficient and resulting in an incomplete burning of the waste sludge.

SUMMARY OF THE INVENTION

The waste product or sludge burning process and installation according to the present invention is designed to obviate the drawbacks and disadvantages encountered in presently used systems for disposing of untreated and industrial waste sludges of a combustible nature containing solid particulate contaminants. To this effect, the present inventive combustion process contemplates the burning of pumpable homogenized combustible waste mixtures containing oil-bearing sludges, which include a proportion of particulate or solid contaminants in an unique and novel installation wherein regulated volumes of pressurized combustion supporting air are mixed with regulated quantities of the the combustible waste sludge prior to combustion thereof, and wherein the proportions of the sludge relative to the volume of air are continuously determined and controlled by adjusting the inlet pressure of the air to thereby vary the effective inlet rate or area for the sludge into the burner installation. Consequently, by predetermining the pressure of the inlet air, thereby regulating the conditions under which the air and waste sludge are admixed prior to combustion, optimum ratios between the air and the combustible waste sludge are attained at all times to effect complete and efficient burning of the combustible sludge-air mixture.

Another features of the present invention lies in the provision of an installation for effecting the combustion process for oil-bearing waste sludges as described herein, which will essentially eliminate the need for valve and pumping elements which are subjected to undue wear and tear. In this connection, the novel installation includes a nozzle chamber arrangement whereby an oil-bearing, solid contaminants containing waste sludge is mixed with air to form a combustible sludge-air admixture, and wherein the optimum ratio between the air and oil-bearing sludge is determined by the internal pressure head within the nozzle chamber responsive to the inlet pressure provided by the air. This installation, as may be readily ascertained, generally obviates the need for complex pumping and valve arrangements required in prior art combustion installations.

Accordingly, it is a primary object of the present invention to provide for a process for burning pumpable, homogenized combustible waste product mixtures, such as oil bearing sludges and the like which contain solid particulate contaminants.

Another object of the present invention is to provide a process for burning combustible waste product mixtures comprising an admixture of solids contaminated oil-bearing sludges and air in which the ratio of air to the oil bearing sludge is maintained within a predetermined range by regulating the pressure of the air being supplied to the combustible waste product mixtures.

Still another object of the present invention is to provide a process for burning combustible mixtures of homogenized oil-bearing sludges containing solid contaminants and including combustion supporting air, wherein the proportion of the volume of air to the quantity of oil-bearing sludge is continuously monitored by varying the pressure relationship of the inlet air to the oil bearing sludge so as to regulate the input of sludge relative to the input of air.

A further object of the present invention is to provide a process for burning combustible admixtures of combustion supporting air and solids-contaminated oil-bearing waste product sludges wherein the process is carried out under controlled pressure conditions and including the addition of a supply of a secondary combustion supporting air to enhance the combustion properties of the combustible admixture.

A still further object of the present invention is to provide an installation for burning combustible homogenized mixtures of oil-bearing solids-contaminated waste product sludges and combustion supporting air under pre-determined conditions adapted to maintain an optimum ratio between the sludges and air so as to effect complete combustion of the combustible mixture.

A yet further object of the present invention is to provide an installation for burning solids-contaminated waste product sludges admixed with air under pre-determined conditions, and which includes pumping means for homogenizing the waste product sludges.

Yet another object of the present invention is to provide a burner installation for waste products or the like including novel burner nozzle structure adapted to admix combustion supporting air and oil-bearing solids-contaminated waste product sludges under controlled pressure conditions for determining optimum air to sludge ratios so as to effect the complete and efficient burning of the admixed air and waste sludges.

BRIEF DESCRIPTION OF THE DRAWINGS

In order that the invention may be more clearly understood and readily carried into effect, reference may now be had to the accompanying drawings, in which.

DETAILED DESCRIPTION OF THE DRAWINGS

Figure 1:
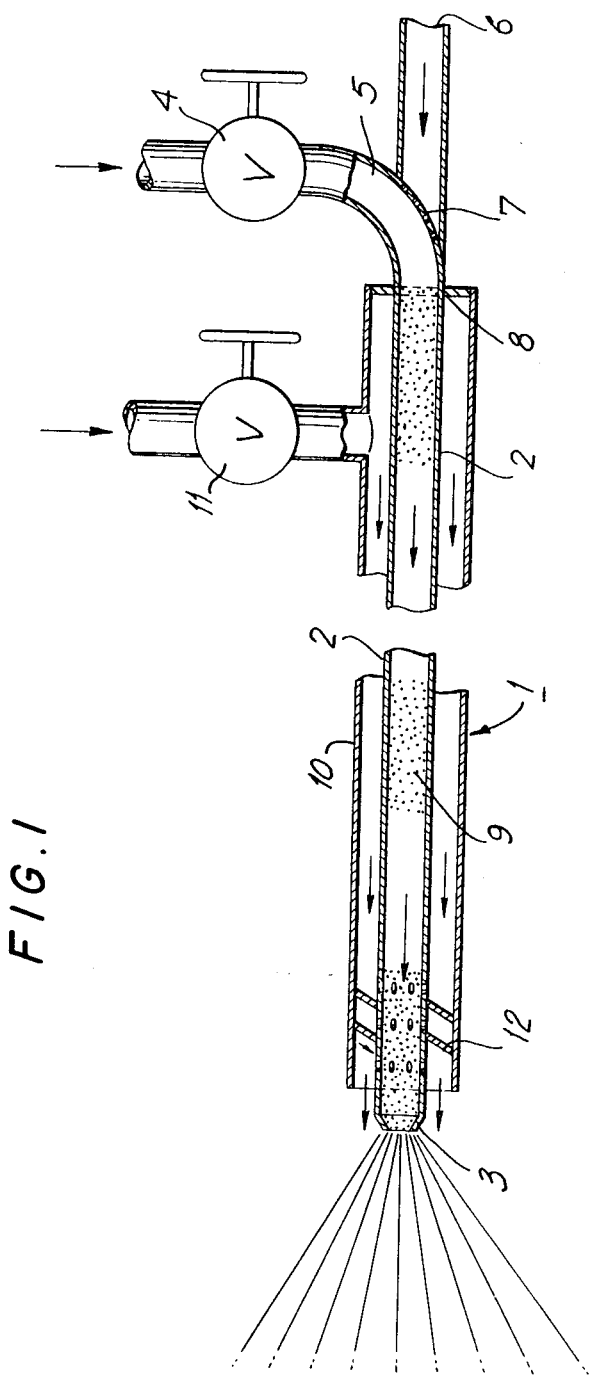
FIG. 1 illustrates a burner nozzle and mixing chamber arrangement for carrying out the combustion process according to the present invention.

Referring now in detail to the drawings, wherein like reference numerals designate corresponding parts throughout the several views, a burner nozzle and mixing chamber arrangement 1 includes a nozzle holder 2 consisting of an elongated tubular conduit, which extends at its forward or downstream end into a burner nozzle 3. The rear or upstream end of the nozzle holder 2 extends into an air inlet conduit 5 through which pressurized air may be conveyed into the nozzle holder 2.

The volume and pressure of the air conveyed into nozzle holder 2 through conduit 5 is regulated by means of a suitable control valve 4 positioned at the inlet end of conduit 5, and with the valve being connected to a suitable source of pressurized air (not shown).

A conduit 6 is adapted to convey a homogenized oil-bearing waste sludge containing solid particulate contaminants into the upstream end of nozzle holder 2 through an inlet aperture formed in conduit 5 adjacent the upstream end of conduit 2. The inlet aperture for the sludge at the juncture of conduit 5 and conduit 6 essentially defines a sludge inlet area 7 to the nozzle holder 2.

As the sludge is conveyed from conduit 6 through inlet area 7 into the upstream end 8 of nozzle holder 2, it is admixed with the pressurized air being supplied through conduit 5 into nozzle holder 2. Effectively, nozzle holder 2 then becomes a mixing chamber for the air and sludge, whereby these are admixed into a combustible sludge-air mixture 9. The sludge-air mixture 9 is continuously conveyed, under the pressure existing within the nozzle holder 2, toward burner nozzle 3 and ejected into the burning chamber of a burner installation, to be described in detail herein below.

In order to enhance the combustion properties of the sludge-air mixture 9, secondary air may be supplied to the mixture 9 in the region of burner nozzle 3 prior to ejection of the mixture into the burner. In order to supply the secondary air to the mixture, a duct 10 is positioned about nozzle holder 2 so as to define an annular passageway therebetween. The duct 10 has a closed upstream end portion, and includes a conduit and regulating valve 11 connected to a suitable source of secondary air (not shown) which may be the same as that for the primary air. A plurality of apertures may be provided in the wall of nozzle holder 2 adjacent the downstream end thereof so as to receive secondary air from the annular passageway formed between nozzle holder 2 and duct 10. A plurality of diagonal vanes 12 may be positioned in the annular passageway defined by duct 10 and nozzle holder 2, in order to create vortex flow and agitation of the secondary air supplied through valve arrangement 11, which will further assist in the mixing of the secondary air with the sludge-air mixture 9 so as to enhance the combustion property of the air and the mixture.

The homogenized sludge conveyed into nozzle holder 2 from conduit 6 is supplied thereto under a pressure head of at least 3 meters of water, and preferably at a pressure head in the range of about 4 to 10 meters of water. Concurrently, the primary air supplied to the nozzle holder 2 through conduit 5 is maintained at a static pressure head of at least 20 meters of water higher than the static pressure of the sludge-air mixture 9 in the upstream region 8 of nozzle holder 2. This will regulate and vary as required the effective inlet area 7 of the sludge entering the upstream end 8 of nozzle holder 2, thereby proportioning and defining the ratio between the volume of air entering through conduit 5 and the quantity of homogenized sludge entering through inlet area 7 from conduit 6. By maintaining the pressure head of the air entering through conduit 5 into the nozzle holder 2 at predetermined levels, the effective inlet area 7 for the sludge may thus be varied due to the back pressure created by the sludge-air mixture 9 in nozzle holder 2. As a result, it is possible closely to control the inlet quantity of sludge passing through inlet area 7 into the upstream end 8 of the nozzle holder, thereby assuring that the ratio of air to sludge forming the combustible mixture will be maintained at optimum condition for complete and efficient burning of the mixture 9 when ejected from burner nozzle 3.

Figure 2:
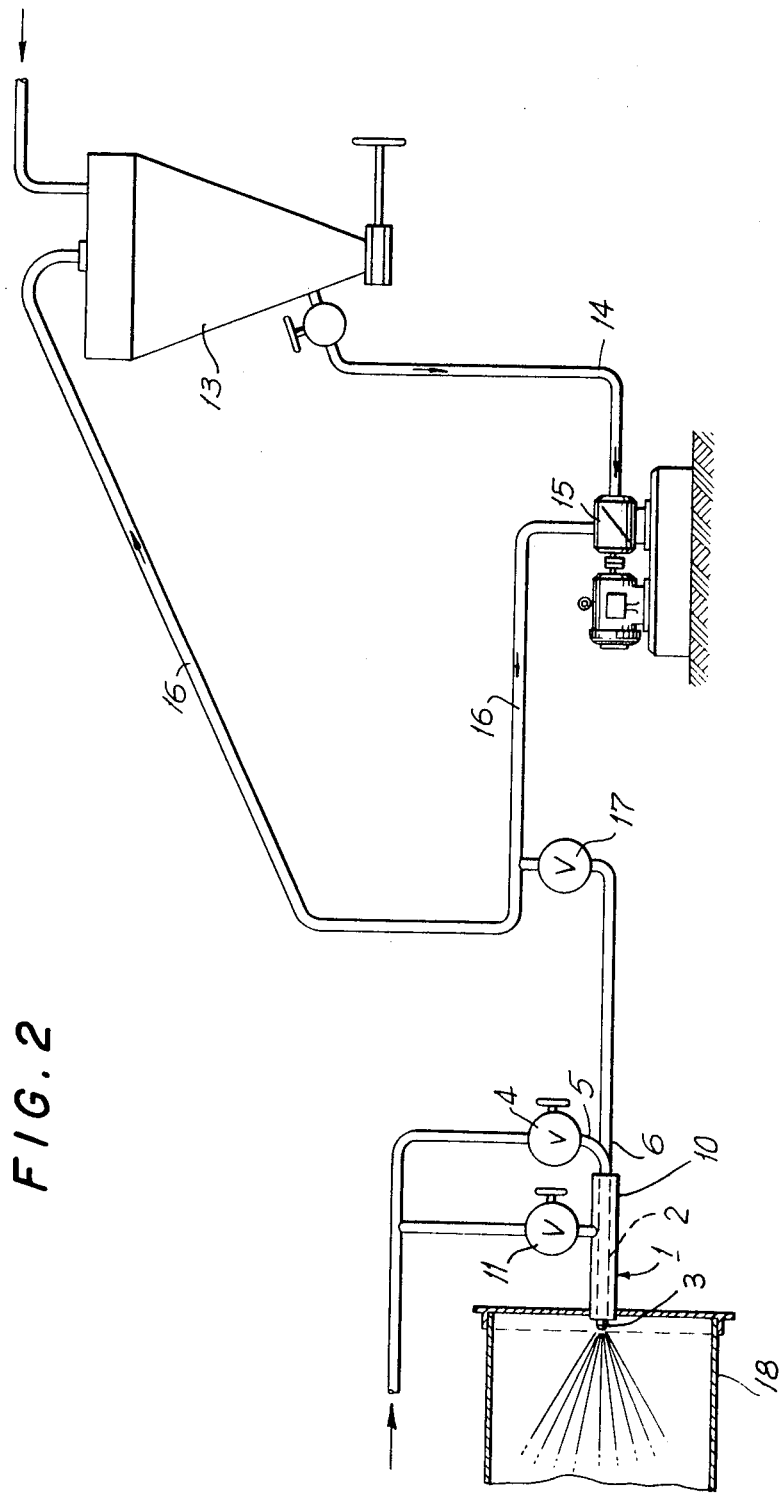
FIG. 2 illustrates a burner installation, partially in schematic, according to the present invention; and, FIG. 3 illustrates a modified embodiment of a burner installation according to the present invention.

Referring to the burner installation of FIG. 2 of the drawing, the nozzle arrangement 1 illustrated in FIG. 1, is shown connected to a hopper or tank 13 which receives a supply of solid particulate-contaminated oily-sludge waste material from a sewage plant or industrial installation. The tank 13 may comprise a generally conical tank structure having an outlet conduit 14 connected to the inlet end of a homogenizing pump 15 which sucks the solids contaminated sludge from the tank 13. The homogenizing pump 11, in effect, mixes and homogenizes the sludge and solid particles therein to form a sludge mixture having a somewhat greater consistency throughout by breaking up some of the solid particles and distributing these throughout the liquid of the sludge in a more evenly distributed suspension. The pump 15 may be a commercial mixing or wobble pump, which is adapted simultaneously to homogenize the sludge and to produce the required pressure head in excess of 3 meters of water for the sludge entering the nozzle holder 2 from conduit 6. The homogenized sludge mixture is then conveyed from the mixing pump 15 under pressure through a return conduit 16 back into the tank 13 so as to be further mixed with additional waste products being conveyed into the tank 13 from the sewage plants or industrial installation. This will increase the extent of mixing and homogenizing of the sludge mixture before it is sucked into the mixing pump 15, thereby providing a sludge of greater homogeniety being supplied to conduit 6 for burning.

Conduit 6 is connected into the return conduit 16 so as to enable tank 13 to receive at least a portion of the homogenized sludge being pumped from mixing pump 15 to pump the homogenized sludge back into tank 13. The quantity of homogenized sludge being conveyed through a conduit 6 from return conduit 16 is regulated by means of a metering valve 17 positioned in conduit 6.

As is shown in FIG. 2, the sludge-air mixture 9 in nozzle holder 2 is ejected through burner nozzle 3 into a suitable burner construction preferably comprising a rotating drum 18 which will assure the complete combustion of the mixture, reducing the latter to ashes which may be readily removed by suitable means.

Figure 3:
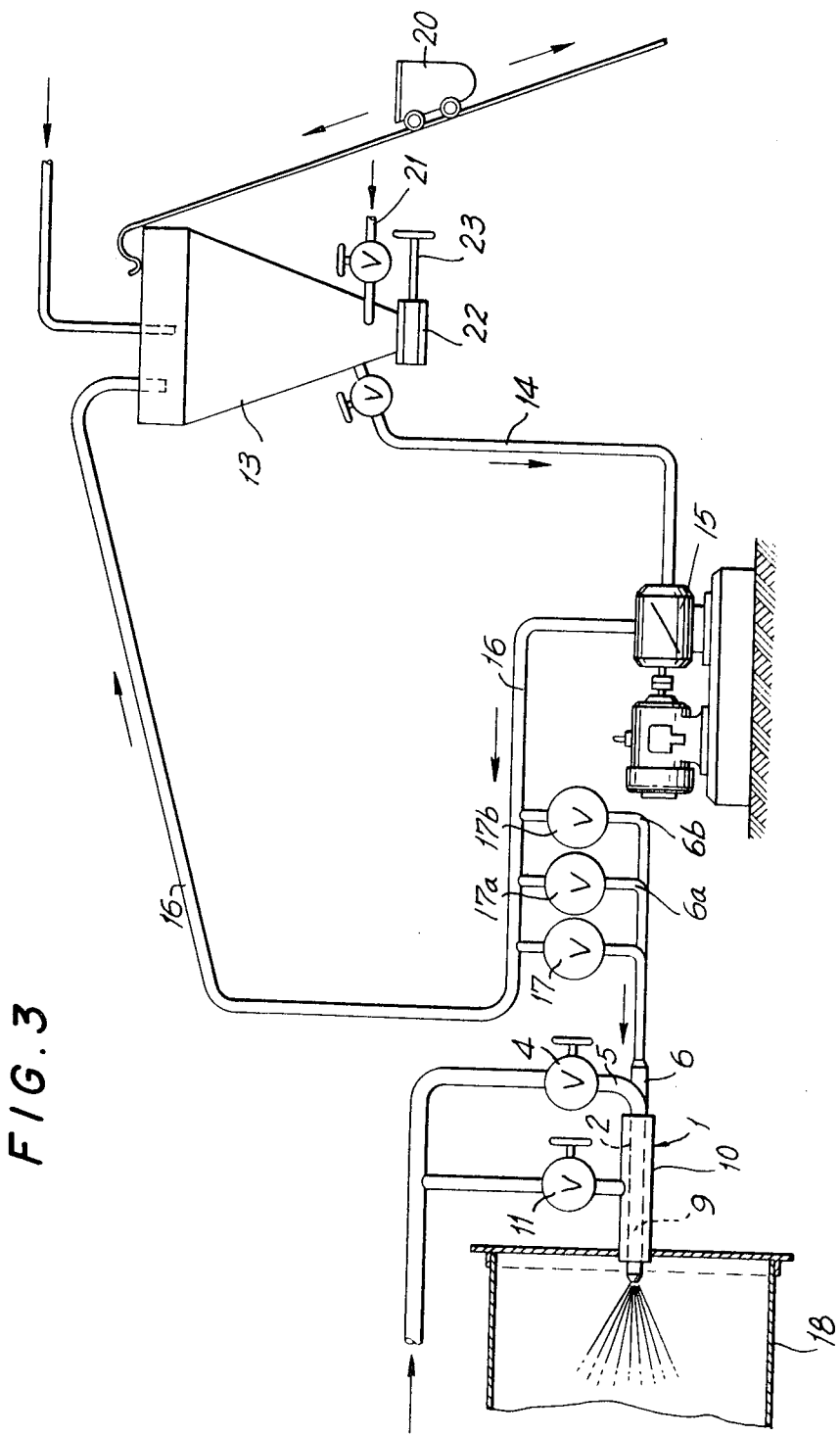

The embodiment of the burner installation illustrated in FIG. 3 of the drawings is essentially quite similar to that described with reference to FIG. 2. In this embodiment, however, in order to afford greater flexibility or control in supplying sludge to the nozzle holder 2 from return conduit 16, a plurality of take-off conduits 6a, 6b, etc., may be connected into return conduit 16 and joined into the common conduit 6. Each of the cut-off conduits 6a, 6b, etc., includes a metering valve arrangement 17a, 17b, etc., analogous to metering valve 17 in conduit 6. Although the drawing only illustrates two branch conduits 6a, and 6b, any number as required may be utilized for connection into return conduit 16. This will afford greater flexibility and control in tapping various quantities of homogenized sludge being processed through return conduit 16 under the pressure generated by homogenizing and mixing pump 15, while concurrently affording greater control over the pressure head on the sludge being fed into nozzle holder 2 through the sludge inlet area 7.

In this embodiment, a bucket conveyor system 20 is adapted to convey quantities of homogenizable solids into the conical tank 13 for mixing with the waste sludges contained therein. This particular aspect of the invention is of particular significance in the petroleum processing industry, wherein an accumulation of spent bleaching earths do not permit the relegation thereof to a dump, or conveyance into a stream, because of the high oil and paraffin wax contents in the bleaching earths. Subsequently, the collective waste slurry or sludge and bleaching earths in the tank 13 are sucked into and through the mixing pump 15 for homogenization thereof prior to recirculation through return conduit 16 or prior to being supplied to nozzle holder 2 through conduit 6.

At times it may be advantageous to increase the solubility of the paraffin wax content in the bleaching earths with the waste sludge contained in tank 13. In order to accomplish this, steam may be added to the sludge in tank 13 by means of a suitable steam pipe 21, so as to heat the sludge mixture in tank 13 to a temperature range of about 80° to 95° C., thereby increasing the homogenization properties of the solid particles-containing waste product sludge.

A particular aspect of the present burner process and installation lies in that it can effectively homogenize and burn oil-bearing sludge mixtures containing an oil content of from about 50 percent to 90 percent, a water content of from 10 percent to 40 percent and a solids or particulate-contaminant content of from about 0 to 10 percent. Heretofore, prior art processes and installations for burning sludges have been unable to successfully and economically burn mixtures containing these particular component percentage range contents.

In addition to the foregoing, the inherent net heating value of the sludge-air mixture 9 ejected through burner nozzle 3 from nozzle holder 2 may drop upon occasion below approximately 4000 Kcal/Kg, which would, in effect, provide a mixture wherein combustion is no longer self-supporting upon ejection into the burner 18, and wherein the combustion must then be supported by adding auxiliary fuel to the mixture. In order to accomplish this, suitable combustion additives, comprising fuels, or similar combustible material, may be injected into the sludge-air mixture 9 in nozzle holder 2 adjacent the region of the burner nozzle 3, through suitable fuel injection means so as to mix with the sludge-air mixture 9 and increase its inherent heating value to a point whereby the combustion of the mixture would be self-supporting.

Although there is no particular limitation as to the size and capacity of a burner installation for carrying out the process according to the present invention, it has been found that a burner having an output capacity of approximately 200 to 600 kilograms of sludge-air mixture per hour at a net heating value of the sludge-air mixture of 4000 to 9000 Kcal/Kg is deemed to be economically feasible, when connected to a waste disposal tank, corresponding to tank 13, adapted to receive waste sludges and having a capacity of 3 to 4 cubic meters. Larger installations, having capacities ex-ceeding 5 tons/hr of mixtures may also be considered as practicable. The tank 13 includes a sump 22 at the bottom thereof in which larger non-homogenizable solids and foreign bodies in the waste sludges, such as bits of metal, can be collected and removed from time to time by means of a slide extractor 23 so as to prevent these solids being sucked into and possibly damaging the mixing and homogenizing pump 15.

As discussed hereinabove, the process and burner installation of the present invention provides for the complete and efficient combustion of pumpable solids-contaminated combustible waste sludge mixtures, including homogenizable waste products, which may contain bleaching earths and including the combination of numerous sedimentary and residual waste products from industry and sewage disposal plants. These solids contaminated sludges may consist of clarified sludges formed particularly from biological sewage disposal and/or dirty oils and similar oily liquid refuse emanating from petroleum processing plants such as oil refineries and petrochemical oil plants; and/or salvage oils and waste oils such as used engine oils, lubricating oils and emulsifier oils; and/or organic residues from varnish and solvent plants; and/or oily-scum sediment sludges from waste water clarification plants, particularly from clarification plants dealing with inorganic and/or organic flocculants. These substances, all of which are satisfactorily and completely processed and burned in accordance with the process and installations herein described may include sedimentary and flotation sludges from the mechanical clarification processes of oil refinery waste waters, cyclate or sludges from the mechanical clarification of oily refined waste waters containing ferric chloride and fillers commercially marketed by Badische Anilin and Soda-Fabrik, Germany, under the Trademark "SEDIPUR" and including muddy sludge oils and oil bleaching earths.

While there has been shown what is considered to be the preferred embodiments of the invention, it will be obvious that modifications may be made which come within the scope of the disclosure of the specification.

What is claimed is:

1. A process for burning a pumpable combustible mixture, such as oil-bearing waste product sludges or the like, containing particulate contaminants, in a burner including nozzle structure having a chamber and a nozzle tip at one end thereof; said process comprising the steps of:

supplying a controlled volume of pressurized primary air to said nozzle chamber;

conveying a quantity of sludge into said nozzle chamber at a point remote from said nozzle tip in predetermined controlled proportion to the volume of said primary air;

mixing said primary air and said sludge to form a combustible sludge-air admixture in said nozzle chamber;

adjusting the pressure head of said primary air to vary the effective sludge inlet area into said nozzle chamber and thereby regulate the ratio between said primary air and said sludge; and continuously ejecting said sludge-air admixture through said nozzle tip into said burner for combustion of said admixture.

2. A process as claimed in claim 1, comprising the further step of;

supplying a controlled volume of pressurized secondary air to said nozzle chamber, said secondary air being adapted to mingle with said primary air-sludge admixture so as to enhance the combustion properties of said admixture.

3. A process as claimed in claim 2, comprising the step of agitating said secondary air upon conveyance into said nozzle chamber in order to increase its mixing rate with the primary air-sludge admixture.

4. A process as claimed in claim 2, wherein said secondary air is conveyed into said nozzle chamber into contact with said primary air-sludge admixture in the region adjacent said nozzle tip.

5. A process as claimed in claim 1, wherein said sludge is conveyed into said nozzle chamber under a static pressure head of at least about 3 meters of water, wherein the static head at the inlet of said primary air into said nozzle chamber is at least 20 meters of water higher than the static pressure head of said primary air-sludge admixture reacting on the effective sludge inlet area of said nozzle chamber, and wherein the static pressure head of the sludge being conveyed into said nozzle chamber is in the range of about 4 to 10 meters of water.

6. A process as claimed in claim 1, including tank means for said particulate contaminated sludge and pump means for homogenizing said sludge prior to conveyance thereof to said nozzle chamber, comprising the steps of;

conveying said sludge from said tank means to said pump means, homogenizing said sludge in said pump means, and recirculating said homogenized sludge under pressure to said tank means, withdrawing at least a component portion of said pressurized homogenized sludge from the sludge being return to said tank means, conveying said component sludge portion under controlled conditions to the sludge inlet of said nozzle chamber.

7. A process as claimed in claim 6, including withdrawing a plurality of component portions of said pressurized homogenized sludge from the sludge being returned to said tank means, and conveying one or more of said component sludge portions under controlled conditions to the sludge inlet of said nozzle chamber.

8. A process as claimed in claim 6, including the step of;

introducing a quantity of steam into said tank means so as to heat said sludge to a temperature of about 80°–95° C.

9. A process as claimed in claim 1, wherein said oil-bearing sludge comprises an oil content of from about 50 percent to 90 percent, a particulate contaminants content of from about 0 to 10 percent, and a water content of from about 10 percent to 40 percent.

10. A process as claimed in claim 1, comprising the step of;

injecting a combustible material into said nozzle chamber to enhance the combustion characteristics of said sludge-air admixture.

* * * * *